United States Patent [19]

Dietlein et al.

[11] 4,143,799

[45] Mar. 13, 1979

[54] SKI RACK, FOR VEHICLES

[76] Inventors: Robert W. Dietlein; William R. Dietlein, both of 3040 Deer Run Rd., Carson City, Nev. 89701

[21] Appl. No.: 837,765

[22] Filed: Sep. 29, 1977

[51] Int. Cl.² .................................................. B60R 9/00
[52] U.S. Cl. ................................... 224/301; 224/315; 211/60 SK; 224/324
[58] Field of Search .............. 224/42.03 R, 42.1 G, 224/42.1 F, 42.1 E, 42.1 R, 29 R, 45 S; 220/11.37 A, 11.37 C; 211/60 SK; 248/59, 74 R, 71, 316 A, 226 B, 203, 500, 505, 25; 24/73 SG, 81 SK; 70/58

[56] References Cited

U.S. PATENT DOCUMENTS

| | | | |
|---|---|---|---|
| 3,242,704 | 3/1966 | Barreca | 224/42.1 F |
| 3,333,750 | 8/1967 | Porter | 224/29 R |
| 3,511,384 | 5/1970 | Pratt | 211/60 SK |
| 3,944,179 | 3/1976 | Piper | 224/42.1 G |

FOREIGN PATENT DOCUMENTS

| | | | |
|---|---|---|---|
| 2155237 | 5/1973 | Fed. Rep. of Germany | 280/11.37 A |
| 2548675 | 5/1977 | Fed. Rep. of Germany | 224/42.1 F |
| 303500 | 12/1952 | Switzerland | 224/42.1 F |

*Primary Examiner*—Trygve M. Blix
*Assistant Examiner*—Kenneth W. Noland
*Attorney, Agent, or Firm*—William W. Haefliger

[57] ABSTRACT

A ski rack for vehicles for transporting of skis where an improved ski retaining apparatus comprises:
structure including a transversely elongated base defining multiple leg openings, and
a U-shaped ski retainer having legs projecting in two of said openings, and
a keeper having a locking position in which the keeper cooperates with at least one of said legs to prevent withdrawal of said retainer relatively away from the base, the keeper movable relative to the base to allow said withdrawal of the retainer relatively away from the base,
whereby a portion of the ski projecting between the base and a cross-piece defined by the retainer may be retained therebetween when the keeper is in said locking position.

10 Claims, 14 Drawing Figures

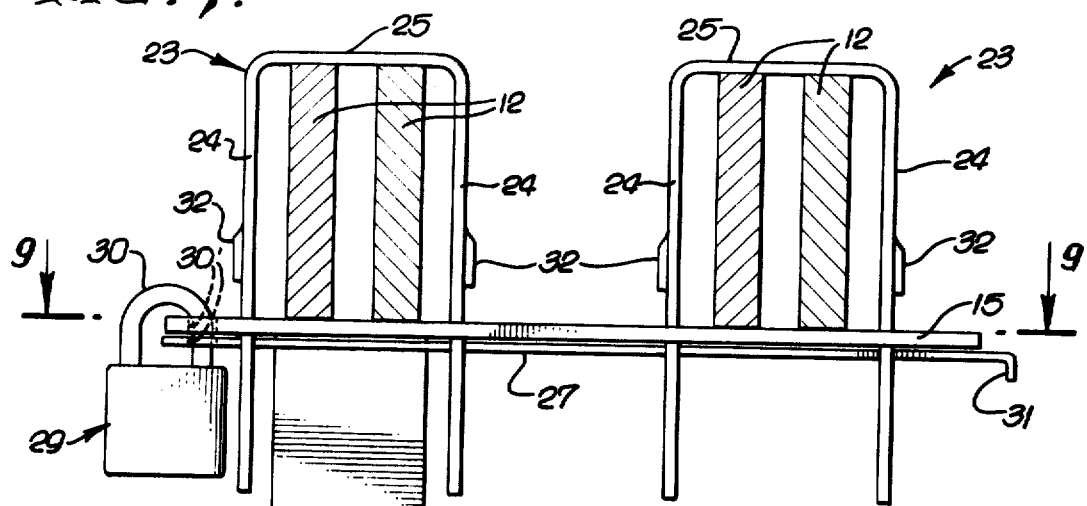
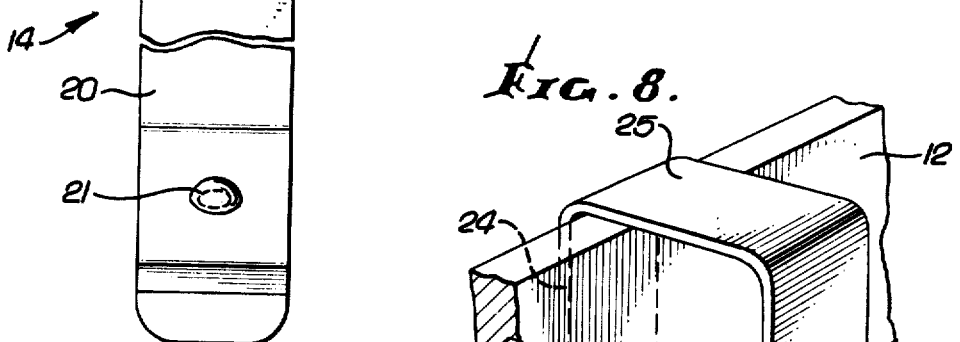
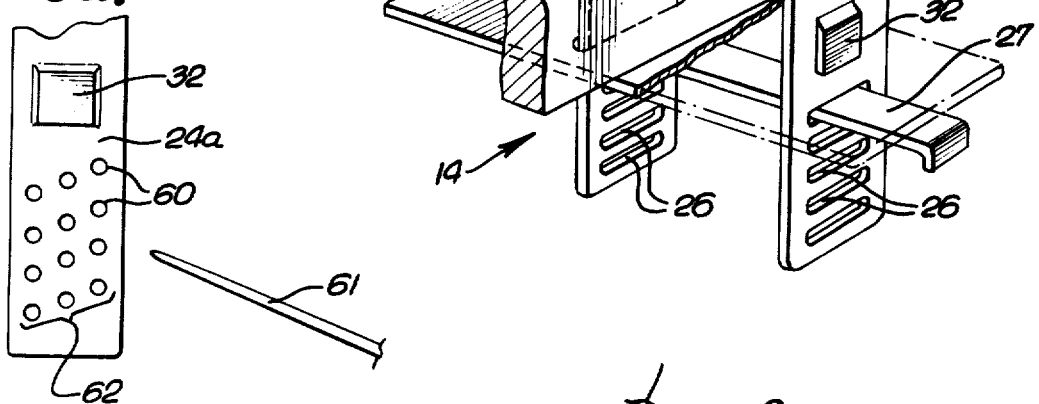
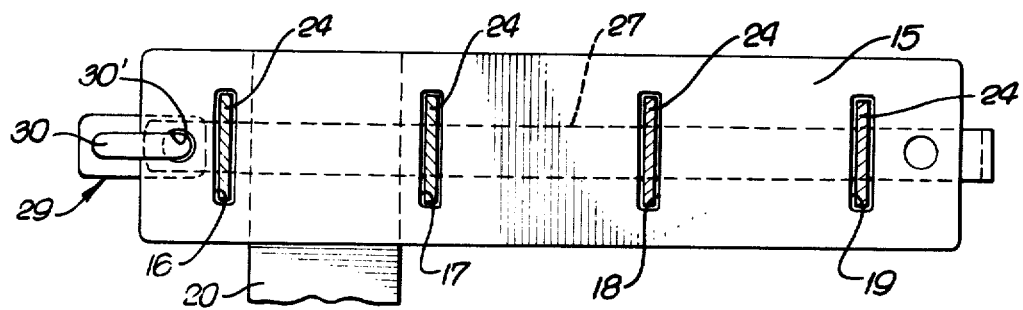

SKI RACK, FOR VEHICLES

BACKGROUND OF THE INVENTION

This invention relates generally to the transporting of skis on vehicles, and more particularly concerns ski retainer components that are improved and simplified in construction, mode of operation and result.

With the expansion in popularity of ski activity, a corresponding need has arisen for reliable, simple and effective ski racks adaptable to different automobile designs, and capable of quickly receiving and releasing skis, as desired. To my knowledge, no prior racks embody the unusually advantageous combinations of structure, function and results as are now afforded by the present invention.

SUMMARY OF THE INVENTION

It is a major object of the invention to provide ski rack components that meet the above described needs and have the unusual advantages referred to and to be described. Basically, the rack includes upper and lower components, the latter comprising (a) structure including a transversely elongated base defining multiple leg openings, (b) a U-shaped ski retainer having legs projecting in two of said openings, (c) a keeper having a locking position in which the keeper cooperates with at least one of said legs to prevent withdrawal of said retainer relatively away from the base, the keeper movable relative to the base to allow said withdrawal of the retainer relatively away from the base, (d) whereby a portion of the ski projecting between the base and a cross-piece defined by the retainer may be retained therebetween when the keeper is in said locking position.

The former or upper component basically comprises (a) a loop-shaped frame to receive a portion of a ski therethrough, and (b) a bracket attachable to a plate of the vehicle, the frame adjustably attached to the bracket so that legs defined by the frame may be shifted into position wherein the skis are snugly retained therebetween.

As will appear, means is provided to lock the frame to the bracket in adjusted position of the frame; and a part or pad may be movably carried by the frame to urge the ski into held position. Accordingly, the ski is retained in a simple, quickly assembled and releasable manner at both upper and lower locations at the rear of the vehicle.

These and other objects and advantages of the invention, as well as the details of an illustrative embodiment, will be more fully understood from the following description and drawings, in which:

DRAWING DESCRIPTION

FIG. 7 is an enlarged elevation on lines 7—7 of FIG. 1, and showing another portion of the rack;

FIG. 8 is a perspective view showing details of the FIG. 7 rack;

FIG. 9 is a section on lines 9—9 of FIG. 7; and

FIG. 9a illustrates another form of retention openings in a bracket leg;

DETAILED DESCRIPTION

Figure 1:
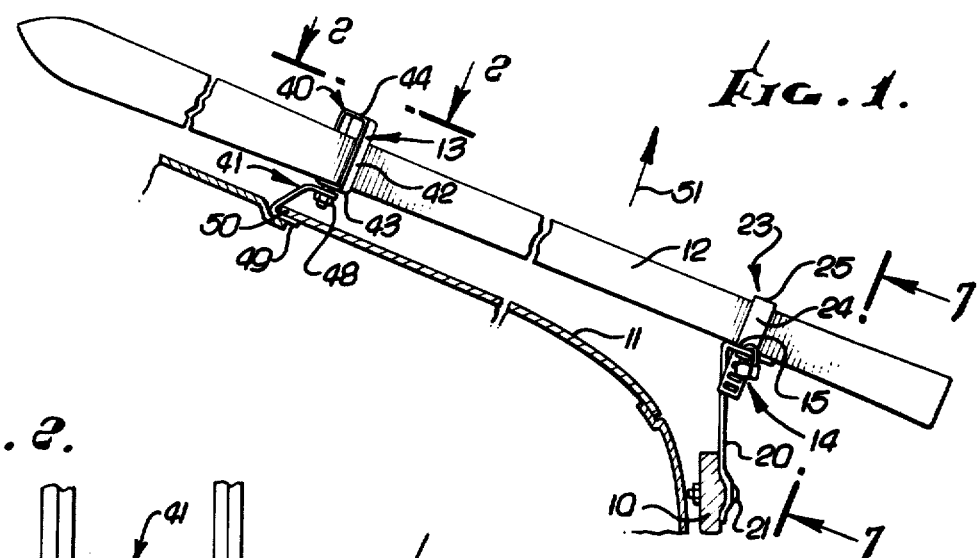
FIG. 1 is a side elevation showing an installation embodying the invention.

In FIG. 1, the rear bumper 10 and trunk lid 11 of a vehicle support skis 12 by means of ski rack components generally indicated at 13 and 14.

Referring to FIGS. 1, and 7-9, the lower component 14 is shown to include a transversely elongated base 15 defining multiple through openings 16-19. The base is shown in FIG. 1 as attached to the vehicle bumper 10 as via an integral metallic strap 20. For example, a bolt 21 through the lower extent of the strap attaches it to the bumper. The strap extends vertically upwardly, and base or plate 15 is angled downwardly relative to the strap, at an acute angle, as is clear from FIG. 1.

Two U-shaped retainers 23 are releasably attached to the base 15 so as to retain skis 12 thereto. Each retainer includes two transversely spaced legs 24 and a cross piece 25 spaced from the base 15. Legs 24 of one retainer project through openings 16 and 17, and the legs 24 of the second retainer project through openings 18 and 19. Further, each of the legs contains slots 26 spaced therealong near the free ends of the legs. Such slots may be elongated in the leg width direction, as shown, to closely fit a transverse keeper 27 selectively projecting through pairs of slots of each retainer. Selection of the slots to be employed is made so as to assure that the skis are snugly held in postion, as for example as seen in FIG. 7, with the base 15 and cross-pieces 25 close to the ski edges. Thus, each retainer holds a pair of skis in position, the spacing of the legs 24 of each retainer being such as to assure that a pair of skis will fit therebetween. The skis are initially received between the legs 24 while the retainer is free of the base, or while legs 24 are only partly inserted into the base openings. Accordingly, quick assembly of the skis into this rack component, and removal of the skis therefrom, is assured. Removal is achieved by endwise withdrawal of the keeper from the slots, and lifting the retainers to free the skis.

The keeper may be held or locked in position, as for example by means such as a padlock 29, with a bail 30 passing through registered openings 31 through the keeper and base, whereby the skis cannot be removed from the retainers 23. In this regard, the ski narrowest width portions extend through the retainers, so that their widest portions are blocked from endwise withdrawal. The keeper may have an end handle 31, enabling its easy manipulation.

Bosses 32 on the legs provide shoulders engageable with the base to limit the extent of reception of the legs through the openings 16-19. Such bosses are near the slots 26.

Referring to FIGS. 1-4, the upper component 13 is shown to include a loop-shaped frame 40 to receive another, i.e. upper, portion of a ski or skis therethrough. Two such frames 40 are typically carried by a bracket 41 attachable to a plate (as for example lid 11) of the vehicle. Each of the two like frame includes transversely spaced upright legs 42, a lower cross-piece 43 and an upper cross-piece 44.

Figure 2:
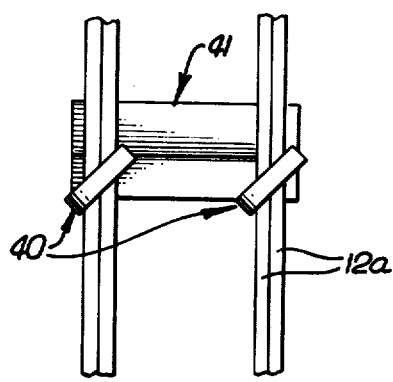
FIG. 2 is an enlarged plan view on lines 2—2 of FIG. 1.

In accordance with the invention, each frame is rotatably attached to the bracket so that the legs 42 may be rotated into position wherein the skis are snugly retained therebetween, as seen in FIG. 2. Further, means is provided to lock the frame to the bracket in rotated position, whereby the skis will not rattle during transport by the vehicle. For this purpose, such means may comprise a threaded stem 45 integral with the frame lower cross-piece 43, and received downwardly through opening 46 in bracket upper flange 47; also, a nut 48 is tightenable on the stem and against the underside of flange 47. Note that flange 47 is spaced from and above bracket flange 49 that fits under the lid edge portion 50 which is normally raisable in the direction of arrow 51 to free the bracket when desired. Accordingly, nut 48 is accessible for tightening. Bracket 41 is thus generally C-shaped.

Figure 3:
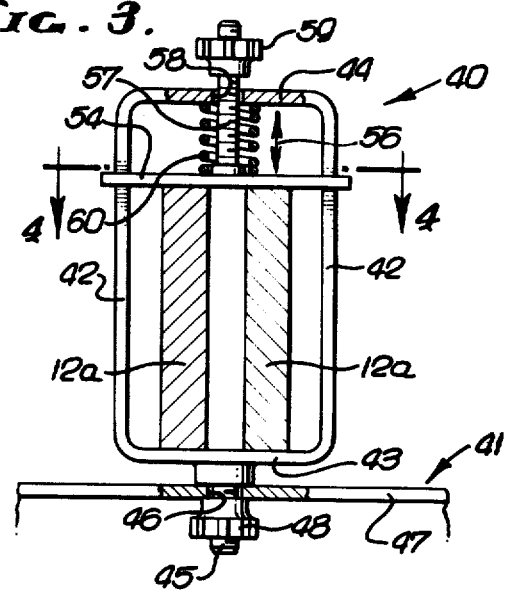
FIG. 3 is an elevation, partly in section, showing details of one portion of the rack.
Figure 4:
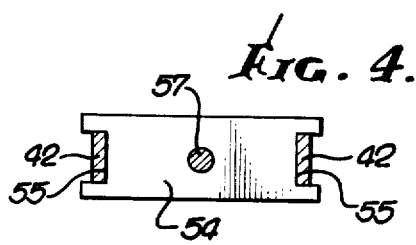
FIG. 4 is a section on lines 4—4 of FIG. 3.

In addition, a part, such as slider 54, is movably carried by the frame to urge the ski upper portion or portions 12a into held or clamped position, as seen in FIG. 3. The slider 54 as illustrated extends transversely, and has edge notches 55 that slidably and guidably receive the legs 42. The slider part 54 is movable in the directions indicated by arrows 56. A guide stem 57 is integral with the part 54, and is guidably received through an opening 58 in cross-piece 44. That stem may be threaded to receive nut 59. That nut adjustably limits stroking of the part toward the skis. It may be tightened against cross-piece 44. A coil spring 60 fits about the stem and yieldably urges the slider part against the ski edges to snugly retain the skis in position between the slider and cross-piece 43.

Figure 5:
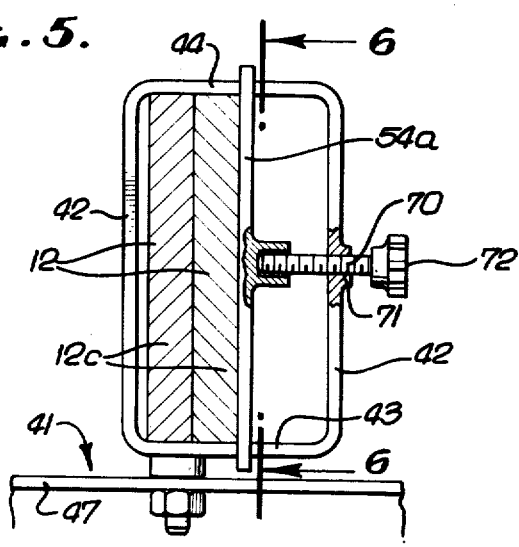
FIG. 5 is a view similar to FIG. 3, but showing a modification.
Figure 6:
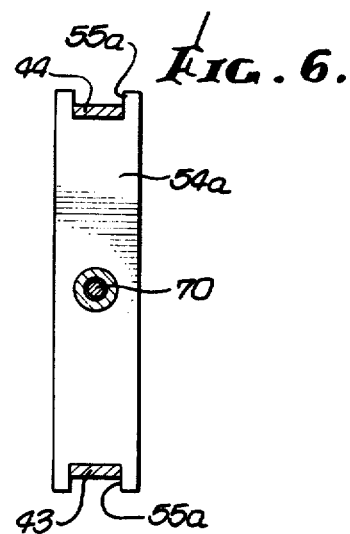
FIG. 6 is a section on lines 6—6 of FIG. 5.

FIGS. 5 and 6 show an alternate form wherein the slider 54a extends upright between the cross-pieces 43 and 44, and has edge notches 55a guidably receiving same. The slider part 54a is urged toward the flat sides 12c of the skis 12 as by a threaded means, as for example a turnbuckle shaft 70. Rotation of the latter in one direction causes shaft threads to turn in bore threads of elements 71 and frame 42 to advance the slider 54a to clamp against the skis; and opposite rotation of the shaft serves to free the slider from the skis. A knob 72 is attached to the shaft to rotate same as the knob is manually turned.

In FIG. 9a, the bracket leg 24a contains modified slots or openings in the form of holes 60 to receive a keeper pin 61. The holes are arrayed in groups of three, indicated at 62, with closely graduated spacing so that fine adjustment of the keeper toward the base 15 may be achieved.

Figure 10:
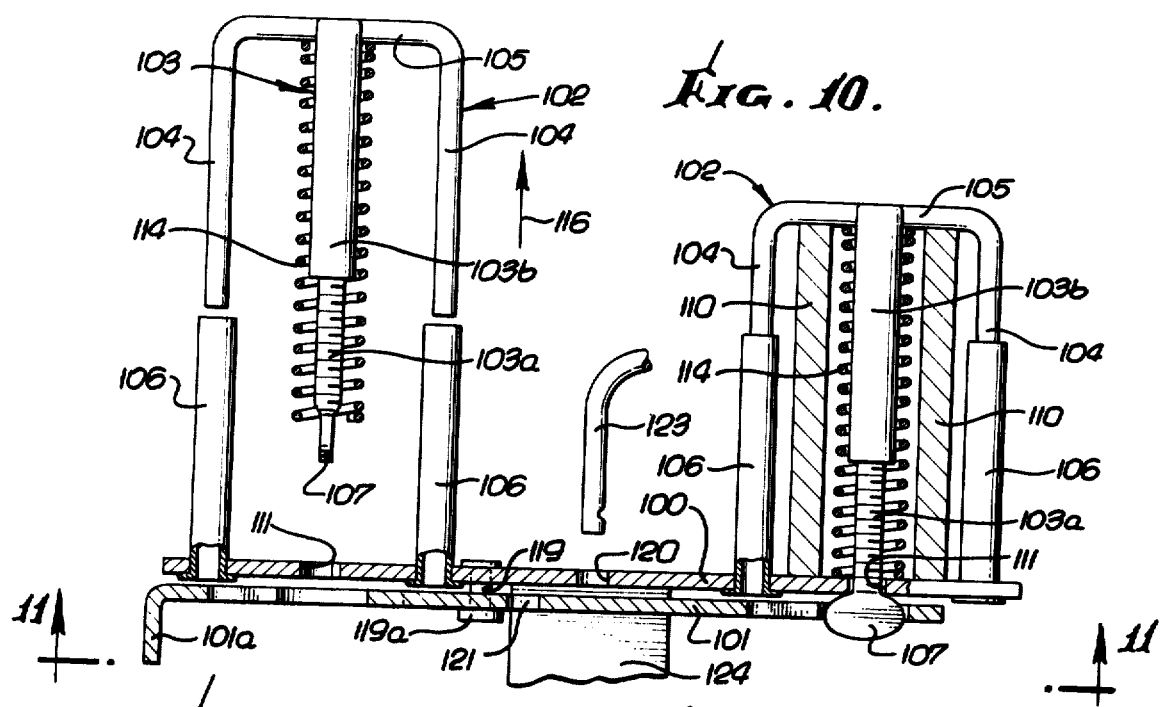
FIG. 10 is a view like FIG. 7, showing a modified form of the invention.

Referring to FIG. 10, the base 100 corresponds to base 15 in FIG. 7, keeper 101 corresponds to keeper 27, and retainers 102 correspond to retainers 23. Each retainer has one leg 103 located between two transversely spaced guide legs 104, all these legs extending generally normal to the base. A transversely extending cross-piece 105 carries the legs. The structure which includes the base 100 also includes tubular guides 106 carried by the base for slidably and telescopically receiving the guide legs 104.

Figure 11:
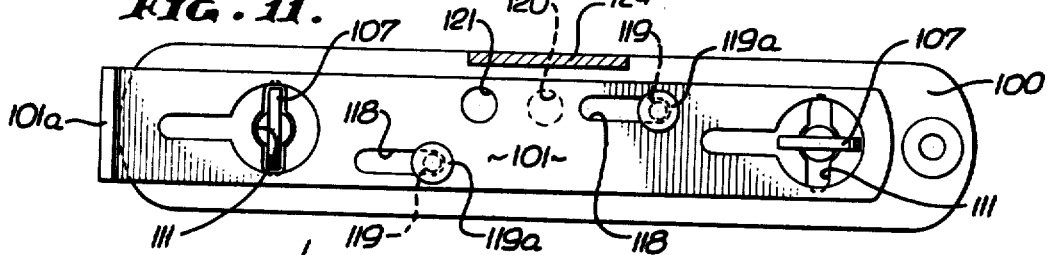
FIG. 11 is a bottom plan view on lines 11—11 of FIG. 10.
Figure 12:
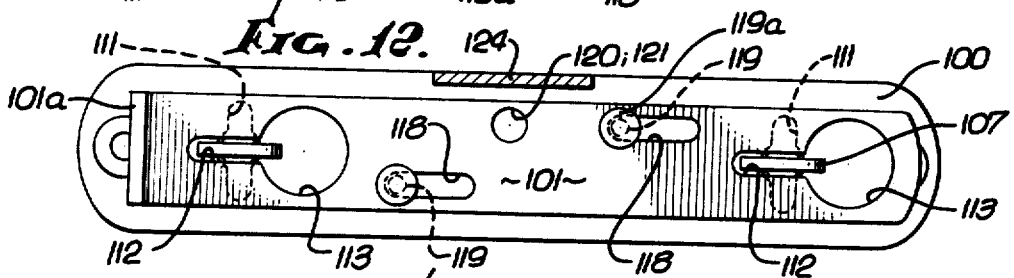
FIG. 12 is a view like FIG. 11 showing the manner of locking a locking mode.

The one leg 103 includes a head, as for example at 107, captured by the keeper 101 in locking thereof as seen in FIG. 12. Note that the keeper is slidable transversely and parallel to the base between that locking position, and another position (see FIGS. 10 and 11) in which the head 107 is freed to allow withdrawal of the retainer away from the frame. See both retainers in FIGS. 10 and 11. Further, the one leg 103 may advantageously include first and second sections 103a and 103b having adjustably threaded interengagement to accommodate lengthening or shortening of the one leg, to accommodate to the width of a ski portion 110 inserted between the base 100 and cross-piece 105, and between leg 103 and either of legs 104, for snugly retaining that ski portion.

The head 107 is integral with and carried by first section 103a to be grasped manually for rotating that section relative to second section 103b. One opening 111 in the base, i.e. a slot, is configured to pass the head in one rotary position thereof (see the head 107 in the left hand portions of FIGS. 10 and 11), and to block withdrawal of the head through that opening in a second (i.e. quarter turned) rotated position of the head. The head in its second position is capturable by the keeper, i.e. see FIG. 12, to prevent quarter turn rotation of the head to first position wherein it would be free for withdrawal through opening or slot 111 in the base. For this purpose, the keeper may include a head capturing slot 112 which extends transversely, and a large opening 113 which extends about the head in FIG. 11 to allow its rotation. Slot 112 intersects large opening 113 as shown.

A compression spring 114 extends about sections 103a and 103b to urge the retainer in the direction of arrow 116, i.e. relatively away from the base; therefore, when the head 107 is turned to the position seen in the left hand part of FIG. 11, the retainer pops outwardly to free the skis for withdrawal. The construction also allows turning of the head, in FIG. 11, to draw the retainer closer to the base to snugly capture the skis. Keeper 101 includes a tang or flange 101a which is manually graspable to manipulate the keeper. Keeper guides include transverse grooves 118 through the keeper, and tongues 119 projecting through the grooves, terminating at heads 119a. Holes 120 and 121 in the base and keeper are registrable in FIG. 12, to pass a padlock bracket arm 123 seen in FIG. 10.

Base 100 has a metallic strap 124 integral therewith, to correspond to strap 20 in FIG. 7.

Figure 13:
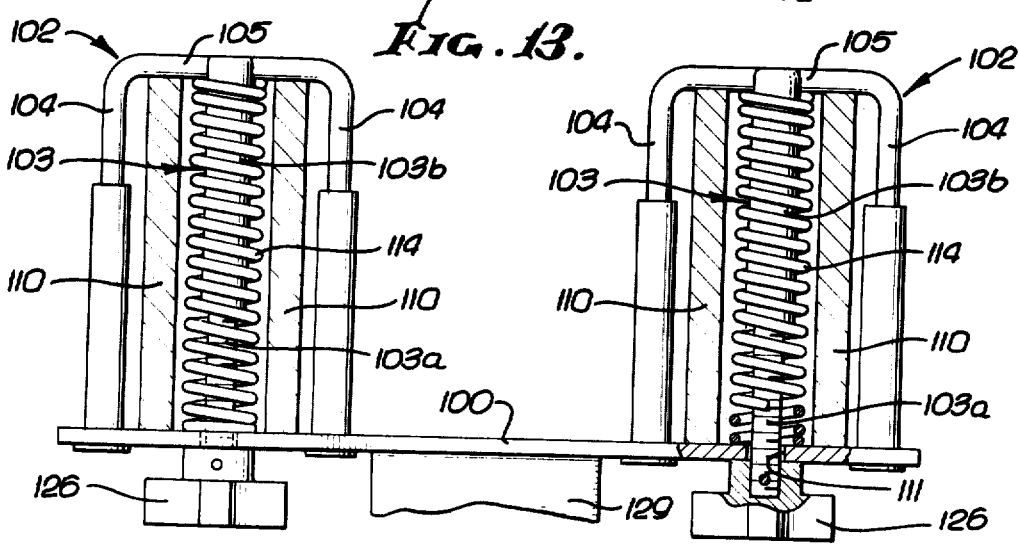
FIG. 13 is a view like FIG. 3, showing a further modified form of the invention.

The retainer and base structure shown in FIG. 13 is very similar to that in FIG. 10, and is given the same numbers, where applicable. The keeper has the form of a knob 126 attached to first section 103a of one leg 103. The base blocks withdrawal of the knob through the one opening 111 in the base. Turning of that knob adjusts the length of leg 103. Bracket 129 integral with base 100 correspond to bracket 41 in FIG. 1, and the use of the FIG. 13 embodiment corresponds to the use of the upper ski racking component in FIG. 1.

We claim:

1. In a ski rack for vehicles, the combination comprising
   (a) structure including a transversely elongated base and defining multiple leg openings,
   (b) a U-shaped ski retainer having legs projecting in two of said openings,
   (c) a keeper having a locking position in which the keeper cooperates with at least one of said legs to prevent withdrawal of said retainer relatively away from the base, the keeper movable relative to the base to allow said withdrawal of the retainer relatively away from the base, (d) whereby a portion of the ski projecting between the base and a cross-piece defined by the retainer may be retained therebetween when the keeper is in said locking position, (e) the legs of the retainer including one leg located between two guide legs, said legs extending generally normal to the base, said structure including guides carried by the base for slidably and telescopically receiving said guide legs, there being a head on said one leg captured by the keeper in said locking position.

2. In a ski rack for vehicles, the combination comprising (a) structure including a transversely elongated base and defining multiple leg openings, (b) a U-shaped ski retainer having legs projecting in two of said opening, (c) a keeper having a locking position in which the keeper cooperates with at least one of said legs to prevent withdrawal of said retainer relatively away from the base, the keeper movable relative to the base to allow said withdrawal of the retainer relatively away from the base, (d) whereby a portion of the ski projecting between the base and a cross-piece defined by the retainer may be retained therebetween when the keeper is in said locking position, (e) the legs of the retainer including said one leg located between two guide legs, said legs extending generally normal to the base, said structure including tubular guides carried by the base for slidably and telescopically receiving said guide legs, said one leg including a head captured by said keeper in said locking position.

3. The combination of claim 2 wherein the one leg includes first and second sections having adjustably threaded interengagement to accommodate lengthening or shortening of said one leg, the head carried by the first section rotatable relative to the second section, one opening in the base configured to pass said head in one rotary position thereof and to block withdrawal of the head through said one opening in a second rotated position of the head, the head capturable by the keeper in said second position, and freed by the retainer in said first position.

4. The combination of claim 3 including a compression spring extending about said sections and urging the retainer in a direction relatively away from the base.

5. In a ski rack for vehicles, the combination comprising (a) structure including a transversely elongated base and defining multiple leg openings, (b) a U-shaped ski retainer having legs projecting in two of said openings, (c) a keeper having a locking position in which the keeper cooperates with at least one of said legs to prevent withdrawal of said retainer relatively away from the base, the keeper movable relative to the base to allow said withdrawal of the retainer relatively away from the base, (d) whereby a portion of the ski projecting between the base and a cross-piece defined by the retainer may be retained therebetween when the keeper is in said locking position, (e) the legs of the retainer including said one leg located between two guide legs, said legs extending generally normal to the base, said structure including tubular guides carried by the base for slidably and telescopically receiving said guide legs, said keeper comprising a knob attached to said one leg.

6. The combination of claim 5 wherein said one leg includes first and second sections having adjustably threaded interengagement to accommodate lengthening and shortening of said one leg, the knob carried by said first section rotatable relative to the second section, one opening in the base passing said first section, the base blocking withdrawal of the knob through said one opening, and a compression spring extending about said section and urging the retainer in a direction relatively away from the base.

7. In a ski rack for vehicles, the combination comprising (a) a loop-shaped frame to receive a portion of a ski therethrough, (b) a bracket attachable to a plate of the vehicle, the frame adjustably rotatably attached to the bracket so that legs defined by the frame may be rotated into position wherein the skis are snugly retained therebetween, (c) a part movably carried by the frame to urge said ski portion into held position, said part slidably interfitting two of said frame legs to be guided thereby, (d) a spring yieldably urging said part relative to said ski portion, and (e) a guide stem attached to said part and guidably received through an opening defined by the frame, said stem being threaded, and there being a knob on said part outside the periphery of the frame.

8. The combination of claim 7 including means to lock the frame to the bracket in said position.

9. The combination of claim 8 wherein said means comprises a threaded stem integral with the frame and passing through an opening in the bracket, and a nut on said stem to be tightened and hold the stem to the bracket.

10. The combination of claim 7 wherein said spring is a coil spring extending about said stem between said part and the frame.

* * * * *